Jan. 9, 1962 E. W. FOLEY 3,016,487
SYSTEM FOR INSPECTING BEARING BALLS
Filed May 6, 1959 6 Sheets-Sheet 3
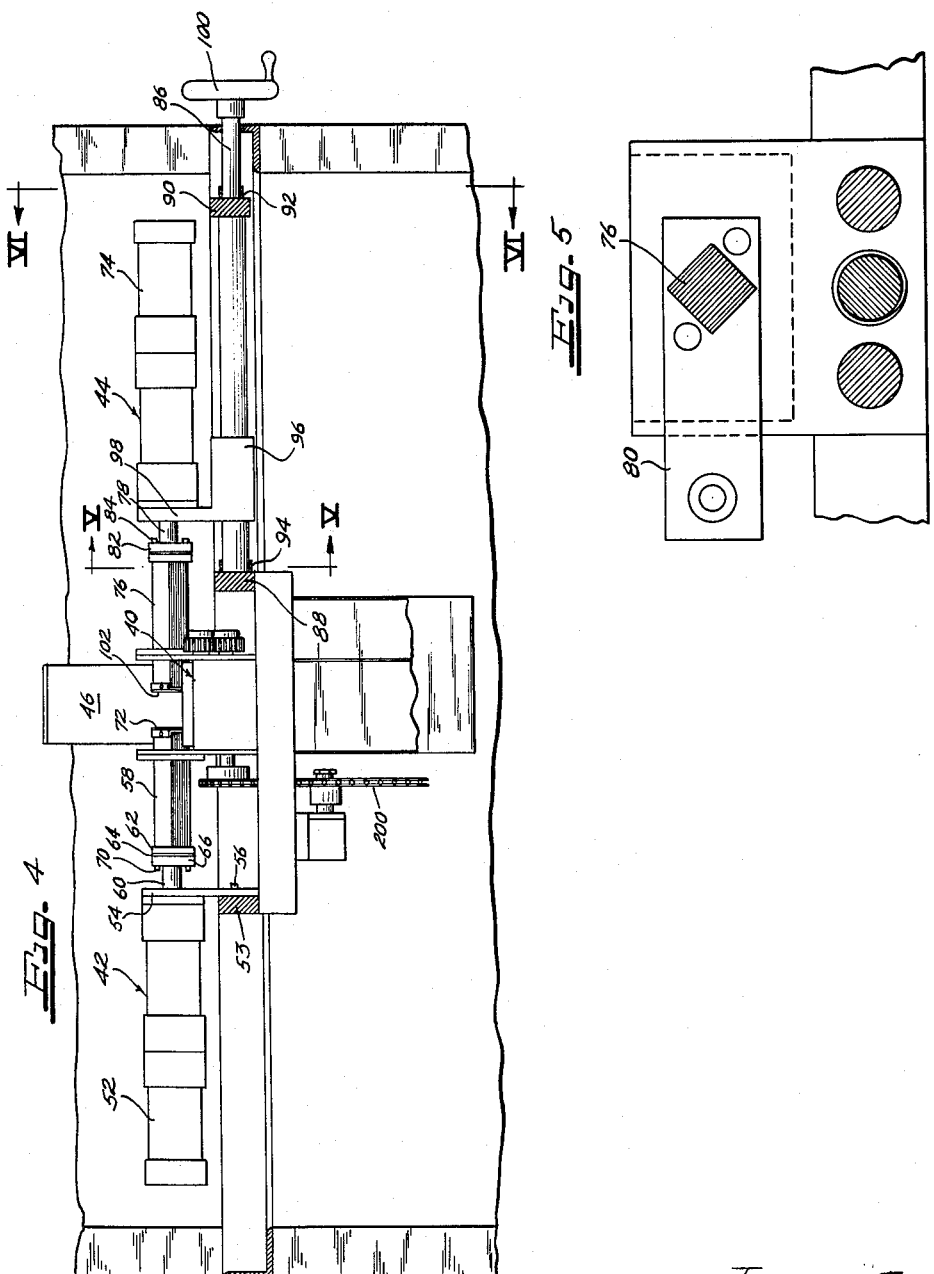
Inventor
EUGENE W. FOLEY Jan. 9, 1962 E. W. FOLEY 3,016,487
SYSTEM FOR INSPECTING BEARING BALLS
Filed May 6, 1959 6 Sheets-Sheet 4
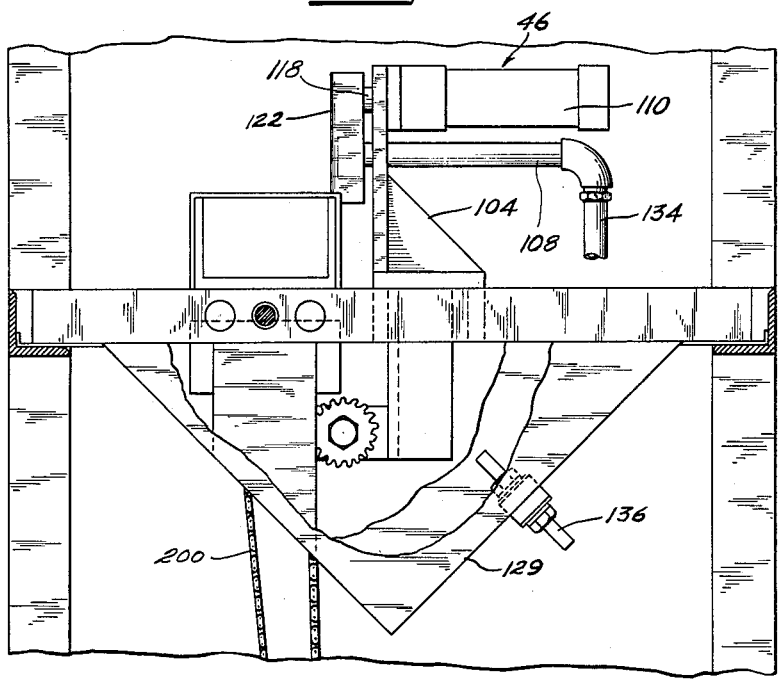
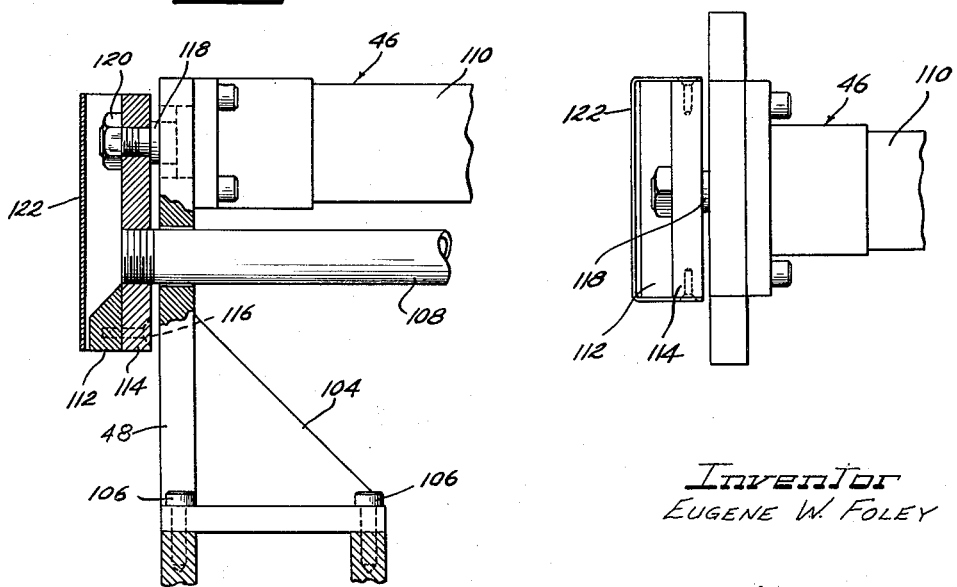
Inventor
EUGENE W. FOLEY Jan. 9, 1962 E. W. FOLEY 3,016,487
SYSTEM FOR INSPECTING BEARING BALLS
Filed May 6, 1959 6 Sheets-Sheet 5
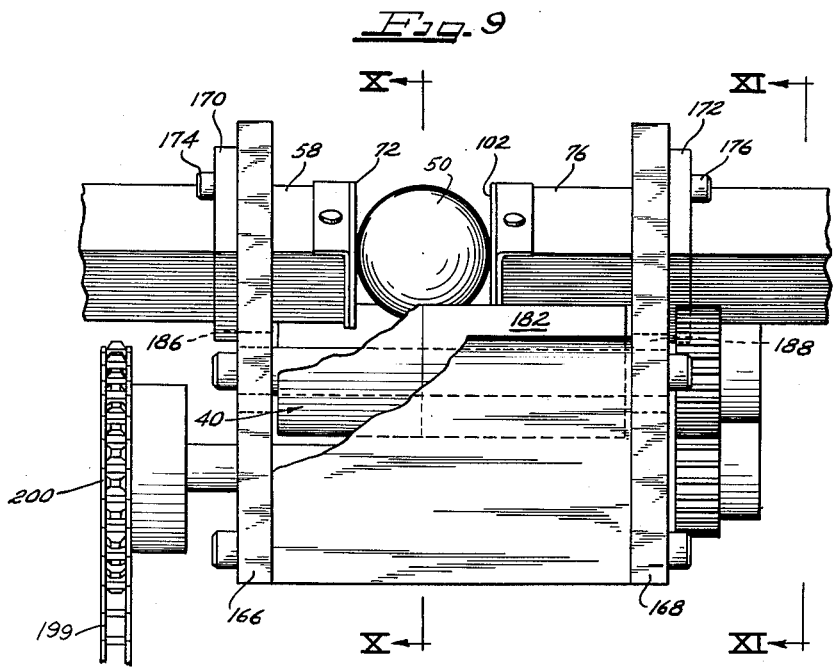
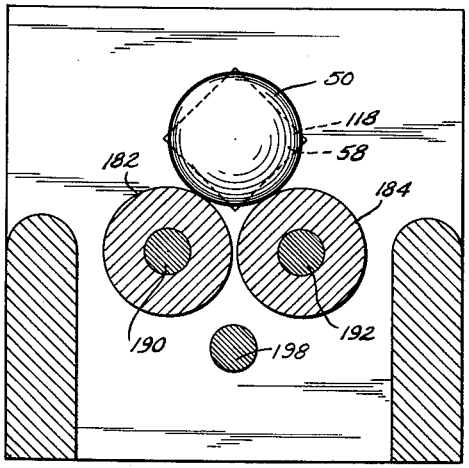
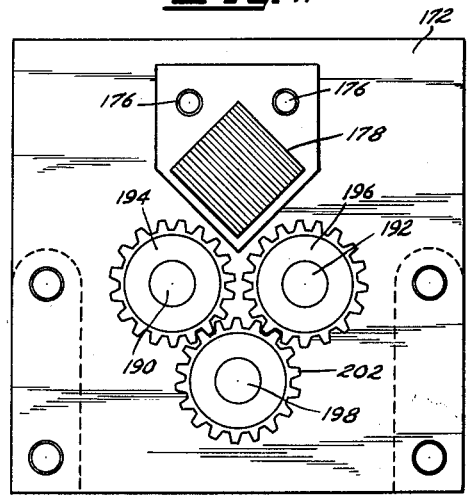
Inventor
EUGENE W. FOLEY
by Hill, Sherman, Meroni, Gross & Simpson
Attys.

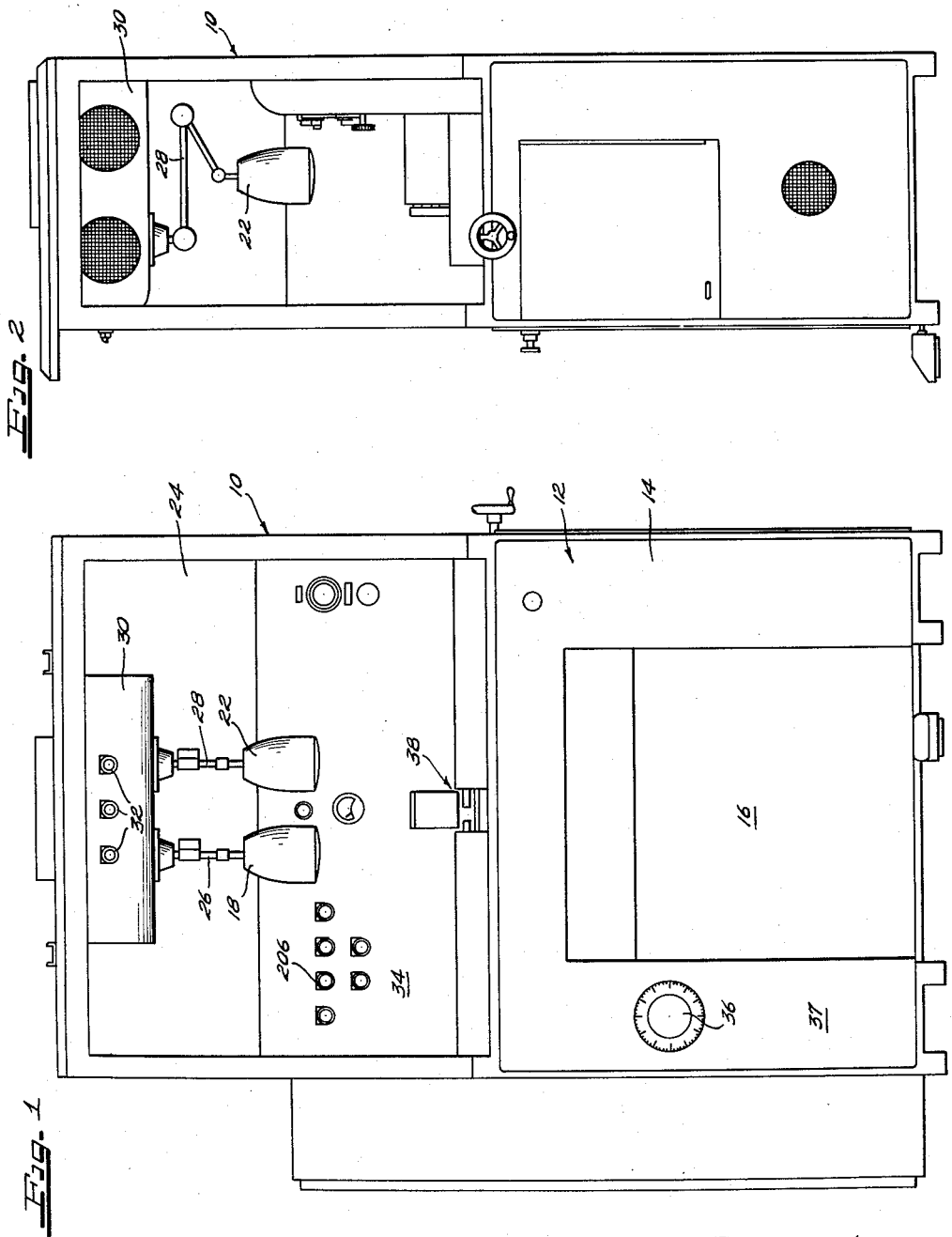

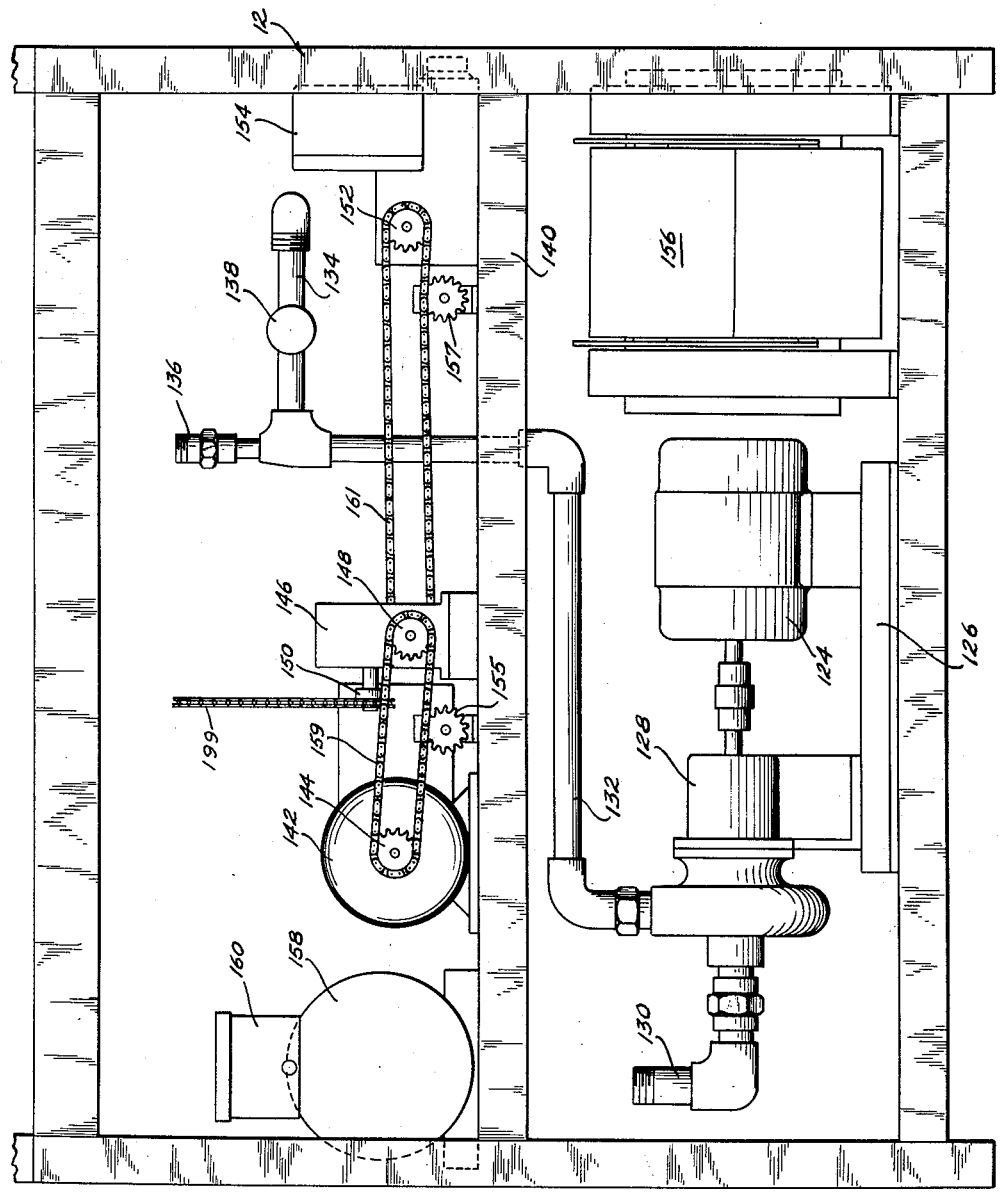

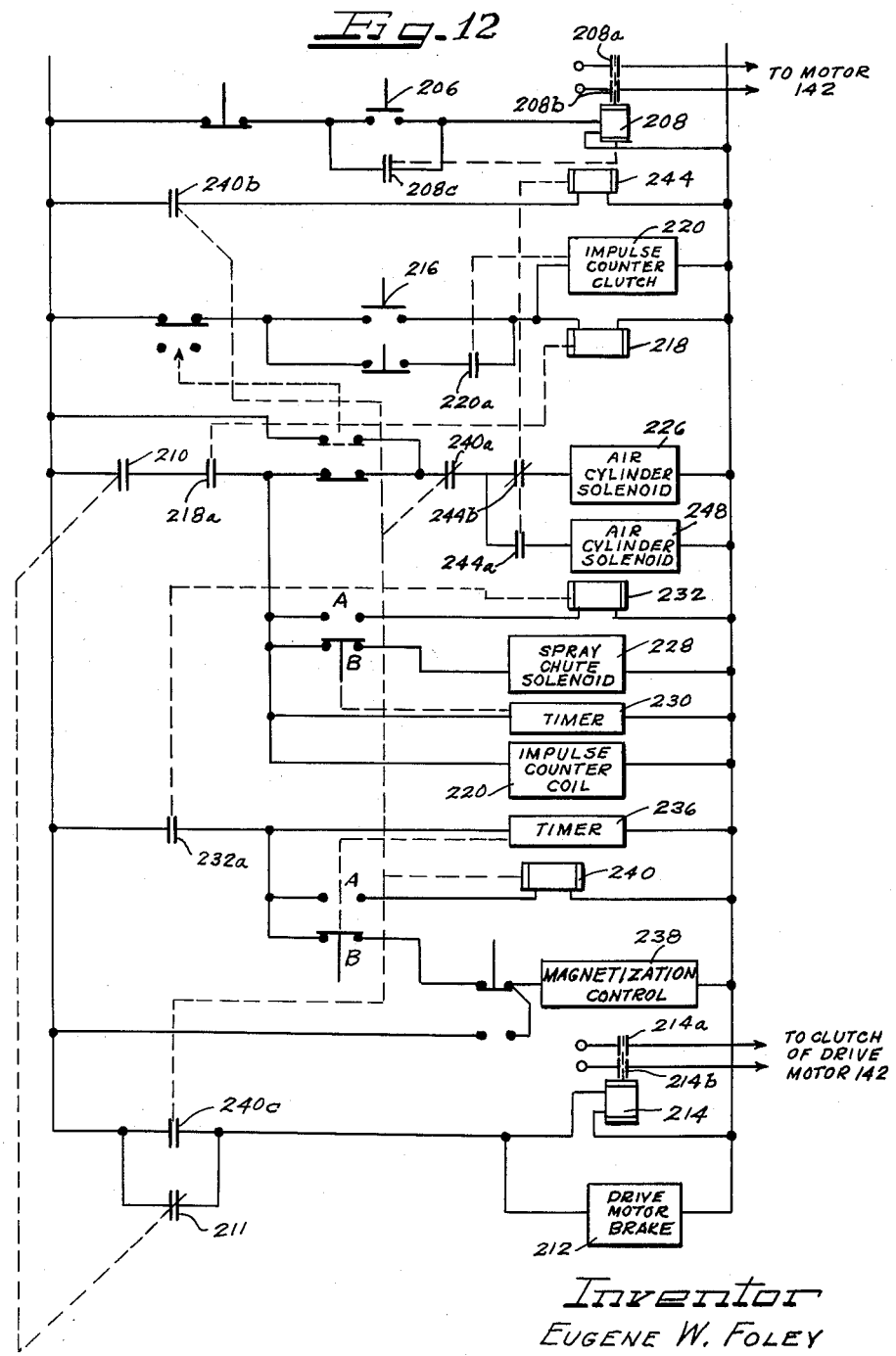

United States Patent Office 3,016,487
Patented Jan. 9, 1962

3,016,487
SYSTEM FOR INSPECTING BEARING BALLS
Eugene W. Foley, Lombard, Ill., assignor to Magnaflux Corporation, Chicago, Ill., a corporation of Delaware
Filed May 6, 1959, Ser. No. 811,331
12 Claims. (Cl. 324—38)

This invention relates to a testing device for ball bearings and the like, and more particularly to a device for automatically rotating bearings through three successive 90° angles and imparting magnetizing current shots thereto at each of the successive positions, so that defects may be detected by means of a magnetically responsive fluid applied to the bearings.

Heretofore, there has been no automatic system for visually detecting flaws in a sequence of roller bearings. The present invention accomplishes such inspection by utilizing a pair of rollers which are tapered slightly toward each of a pair of contacts for automatically and adjustably engaging successive ball bearings fed to the rollers. The rollers cooperate to rotate the balls placed thereon through three successive, mutually perpendicular axes, and the balls are bathed in a bath of magnetic material which is under appropriate light in a manner which will expose flaws in the bearings.

Accordingly, it is an object of the present invention to provide an automatic means of testing ball bearings or the like for flaws without the need for reading of meters or other calibrating activities, the balls being processed so as to visually reveal flaws thereon.

Another object of the invention is to provide roller means for rotating the balls at a magnetizing station so that they may be magnetized at each of three 90° displaced positions to afford complete magnetization.

Another object of the invention is to provide a device as described having automatic controls for accomplishing the fluid application and ball rotation operations referred to.

Other objects and advantages of the invention will become apparent as the description proceeds in accordance with the drawings, in which:

Referring now to the drawings,

FIGURE 1 is a front elevational view of a testing apparatus according to the invention;

FIGURE 2 is a side elevational view of the apparatus shown in FIGURE 1;

FIGURE 3 is a front elevational view of a pumping system and control means;

FIGURE 4 is a front elevational view of bearing placement means;

FIGURE 5 is a vertical sectional view taken along the lines V—V of FIGURE 4;

FIGURE 6 is a vertical sectional view taken along the lines VI—VI of FIGURE 4;

FIGURE 7 is an enlarged fragmentary view partly in vertical section of spray means disclosed in FIGURE 6;

FIGURE 8 is a top plan view of the spray means shown in FIGURE 7;

FIGURE 9 is an enlarged fragmentary front elevational view of the bearing placement means of the invention;

FIGURE 10 is a vertical sectional view taken along the lines X—X of FIGURE 9;

FIGURE 11 is a vertical sectional view taken along the lines XI—XI of FIGURE 9; and FIGURE 12 is a schematic showing of the control circuit for the apparatus of the invention.

Referring now to the drawings, a flaw detection apparatus 10 is shown in FIGURES 1 and 2 which includes a housing structure 12 having a lower portion 14 defining a recess 16 to permit operation of the device 10 from a seated position. A pair of lamps 18 and 22 are adjustably held from an upper portion 24 of the housing by means of arms 26 and 28 secured to a control box 30. Suitable controls 32 are provided for the lights, and a control planel 34 is mounted at the rear of the upper housing portion 24 as shown. A variable intensity current control 36 is provided on the outer face of the lower housing portion 14.

In accordance with the invention, a magnetizing station 38 is formed within the housing 12, in a location which is readily accessible for control and inspection. As seen in FIGURES 4, 5 and 9–11, the station 38 includes a roller assembly 40, a head stock assembly 42, and a tail stock assembly 44. A spray station 46 (FIGS 6–8) is mounted on the housing 12 by means of a bracket 48 in position to apply magnetically responsive fluid to a ball bearing 50 which may be positioned on the roller structure 40, as hereinafter further described.

The magnetic fluid may be in the form of dry particles or particles suspended in a suitable liquid.

The head stock assembly 42 includes an air cylinder 52, mounted on a housing frame piece 53 by means of a bracket 54 and bolts 56. An extension 58 is connected to a piston structure 60 in the air cylinder 52 and is provided with a bus member 62, an insulator member 64, and a backing plate 66 connected by suitable bolt members 70. The extension 58 carries a contact 72 for engaging a bearing as hereinafter described.

The tail stock assembly 44 includes an air cylinder 74 carrying an extension 76 connected to the air cylinder by a piston structure 78. A bus member 80 and a backing plate 82 are also provided as well as suitable bolts therefor 84. A roll pin 86 is mounted within supports 88 and 90 provided with bushings 92 and 94 and passing through a drive bushing 96 carrying a cylinder support 98. The roll pin is rotatable by a hand wheel 100 affording manual adjustment of the axial position of the air cylinder 74. The extension 76 carries a contact 102 cooperating with the contact on the head stock 82 for controlling and magnetizing a bearing.

The spray station 46 includes a bracket 104 mounted on the housing by bolts 106, a pipe 108 connected to a fluid supply system as hereinafter described, an air cylinder 110 and a spray block 112 connected to a backing plate 114 by suitable screws 116, the backing plate being connected to the air cylinder by a piston element 118 threadedly receiving a jam nut 120. A cover element 122 is also preferably mounted on the block 112 which is adapted to cooperate therewith to dispense fluids entering through the conduit 108.

The lower portion of the housing 12 is provided with equipment installations which include a pump motor 124 on a base 126 driving a pump 128 to recirculate fluid from a tank 129 (FIGURE 6), which is provided with a supply of magnetizing fluid, through a conduit 130. The pump supplies fluid to the station 46 through a conduit 132, having a portion 134 leading to the station and an extension 136 leading to a stud 137 in the tank. A gate valve is provided in the line 134 to permit selective supply to the station 46 or agitation of the fluid in the tank.

A floor 140 supports a drive motor 142 carrying a sprocket 144 which drives a reduction gear system 146 by means of a sprocket 148, a sprocket 150 being connected to the reduction gear system 146 for driving the roller system 40 as hereinafter described. Also driven by the drive motor 142 is a sprocket 152 for driving a counter 154, and idlers 155 and 157 may be provided for the chains 159 and 161.

A transformer 156 is mounted on the lower portion of the housing installation and a powerstat 158 on the floor 140 is provided together with terminal box 160. The power 156 converts high voltage low amperage A.C. line current into high amperage low voltage current for magnetizing purposes. The infinitely variable powerstat 158 regulates the amperage of the magnetizing current. For example, an isolation type transformer may be used to obtain 110 volts for the operation of the control circuit of FIGURE 12.

Referring now to FIGURES 9-11, the roller assembly 40 is mounted by end blocks 166 and 168 on the housing between the head stock 42 and tail stock 44. The end blocks carry guides 170 and 172 secured thereto by bolts 174 and 176. The guides define recesses 178 and 180 dimensioned to receive therethrough the extensions 58 and 72 of the head stock 42 and tail stock 44 respectively. A pair of rollers 182 and 184 are journalled in parallel with the head and tail stocks in the end blocks by bearings 186 and 188 for shafts 190 and 192 carrying gears 194 and 196. The rollers (FIGURE 9 ) are tapered from their centers, so that a bearing will rest against one or the other of the contacts, and in order to drive the rollers, a drive shaft 198 is journalled in the end blocks and connected by a chain 199 and sprocket 200 to the aforementioned sprocket 150 connected to the reduction system 146. The other end of the shaft 198 carries a gear 202 in meshing relationship with the gears 194 and 196 for the rollers 182 and 184 as shown in FIGURE 4.

When a ball bearing 50 is mounted on the rollers above the nip thereof, the head stock 42 and tail stock 44 may be actuated in cooperation with the rollers 182 and 184 to move the ball through three successive 90° rotations so that the contacts on the extensions may afford three mutually perpendicular magnetizing shots which will insure complete magnetization of the bearing. The spray assembly 46 is energized in synchronization with the rollers and the head and tail stock extensions 58 and 72 so that the ball is thoroughly covered with a magnetic fluid and may thereby be inspected, since any flaw will create a flux distortion which may be seen by the application of light from the lights 16 and 18. Accordingly the ball is bathed with each "shot."

The rotation of the bearings for 90° angles between three successive current shots assures that any possible surface defect will intersect a circular magnetic field. Although the application of the magnetic bath and of the clamping action of the magnetizing contacts is accomplished by solenoid controlled air cylinders, the tail stock contact assembly is initially advanced or retracted by the hand wheel to afford proper spacing for various sizes of bearings which may be tested.

The process of magnetization and inspection may be accomplished as follows. With the ball bearing 50 resting against one of the contacts, e.g., contact 72, the other contact 102 is actuated into engagement therewith and a magnetizing shot is applied. The contact 102 is retracted, the bearing is rotated by the rollers one and one-fourth turns for inspection (in a preferred procedure) and the contact 72 moves to roll the bearing between the rollers for a quarter of a turn. Thereupon the contact 102 engages the bearing and a second magnetizing shot is applied. The contact 72 is moved to the left, the rollers rotate the ball one and one-fourth turns, and contact 102 is moved toward the contact 72 to roll the ball between the rollers for a quarter turn. A magnetizing shot is again applied, whereupon the contact 102 is moved in the reverse direction, and the rollers rotate the ball for a final one and one-fourth turn for inspection purposes.

Referring to FIGURE 12, a control circuit is shown for operating the device 10, by controls such as shown on panel 34 of FIGURE 1. Upon depression of a drive push button switch 206, a contactor 208 is energized to close contacts 208a and 208b thereof and start the drive motor 142. If a limit switch 210 is actuated the motor output shaft will not rotate. If the limit switch 210 is not actuated, its normally closed contacts 211 will energize a drive motor brake coil of a brake 212 for the output shaft of the drive motor 142, releasing the brake, and will energize a relay 214 to close contacts 214a and 214b thereof and apply power to a clutch between the drive motor 142 and its output shaft. The motor output shaft will rotate until the limit switch 210 is actuated, when its contacts 211 open to energize the brake and deenergize the drive motor clutch.

With a part positioned between the clamping heads, a foot switch 216 is depressed, and a relay 218 and an impulse counter clutch coil 220, associated with the counter 154, are energized. Contacts 220a are closed by the energization of the coil 220 to lock in the impulse counter clutch coil 220 and the relay 218. Contact 218a of relay 218 then closes to energize a solenoid 226 which controls air cylinder 74 to extend the air cylinder for the tail stock 44 to move contact 102 and clamp the parts. A solenoid 228 for the spray chute is also thereby energized to actuate the air cylinder 110 thereof and bathe the part. A timer 230 and a coil 220 associated with the counter 154 are concurrently energized also.

After the timer 230 "times out," its contacts change to the "A" position, thus de-energizing the solenoid 228 the spray chute and retracting the spray chute. This energizes a relay 232 and its contacts 232a close to energize a timer 236 which is set preferably for two-fifths of a second. A magnetization control device 238 is simultaneously energized giving the part a magnetic current shot for the time interval indicated.

After the timer 236 "times out" its contacts change to the "A" position, a relay 240. The relay contacts 240a open to de-energize the tail stock control solenoid (thereby retracting the tail stock air cylinder to unclamp the part). The contacts 240b then close to energize an impulse relay 244. The contacts 244a of the impulse relay 244 open to interrupt the circuit to the head stock solenoid 248 for the next part of the cycle. The relay contacts 240c close to energize the drive motor brake coil, thereby releasing the brake 212 and also energizing relay 214. The relay 214 energizes the drive motor clutch coil. The drive motor output shaft then rotates, revolving the part for inspection and releasing the line switch 210, and the line switch contacts 211 close to hold the relay 214 and the drive motor brake coil in energized condition. This sequence is repeated for the various magnetizing shots.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A device for testing ball bearings and the like comprising a support, a pair of rollers journalled in parallel relation on said support, means for rotating said rollers in the same direction, a pair of magnetizing contacts, and means for reciprocating said contacts toward and away from one another above said rollers, whereby a bearing placed between said rollers and said contacts may be rotated through successive 90° angles to receive successive magnetizing shots from said contacts.

2. A device for testing ball bearings and the like comprising a support, a pair of rollers journalled in parallel relation on said support, means for rotating said rollers in the same direction, and a pair of magnetizing contacts in parallel relation with said rollers, means for reciprocating said contacts toward and away from one another, whereby a bearing placed between said rollers and said contacts may be rotated through successive 90° angles to receive successive magnetizing shots from said contacts, and means for spraying magnetic fluid onto said rollers to coat a ball bearing thereon.

3. A device for testing ball bearings and the like comprising a support, a pair of rollers journalled in parallel relation on said support, means for rotating said rollers in the same direction, a pair of magnetizing contacts in parallel with said rollers, means for reciprocating said contacts toward and away from one another, whereby a bearing placed between said rollers and said contacts may be rotated through successive 90° angles to receive successive magnetizing shots from said contacts, means for spraying magnetic fluid onto said rollers to coat a ball bearing thereon and light means for directing flaw-detecting light toward said rollers.

4. A method of detecting flaws in ball bearings and the like comprising the steps of successively rotating a ball bearing through three mutually perpendicular axes, coating the ball bearing with magnetic fluid, and imparting a magnetizing shot to the ball in diametric alignment with each of the axes.

5. A method of detecting flaws in ball bearings and the like comprising the steps of successively rotating a ball bearing through three mutually perpendicular axes, spraying the ball bearing with magnetic fluid and imparting a magnetizing shot to the ball in diametric alignment with each of the axes.

6. A method of detecting flaws in ball bearings and the like comprising the steps of successively rotating a ball bearing through three mutually perpendicular axes, coating the ball bearing with magnetic fluid, imparting a magnetizing shot to the ball in diametric alignment with each of the axes and directing light onto the bearing.

7. A method of detecting flaws in ball bearings and the like comprising the steps of successively rotating a ball bearing through three mutually perpendicular axes, coating the ball bearing with magnetic fluid, imparting a magnetizing shot to the ball in diametric alignment with each of the axes and directing light onto the bearing at each successive position thereof.

8. A testing apparatus for ball bearings and the like comprising a support, a pair of rollers journalled in parallel relation on said support, means for rotating said rollers in the same direction, a pair of magnetizing contacts movable toward and away from each other in parallel relation to said rollers, air cylinder means for controlling said contacts, control means for synchronizing the movement of said rollers and air cylinder means to rotate a bearing placed on said rollers through successive mutually perpendicular axes and means for energizing said contacts to impart successive magnetizing shots upon successive movements of said rollers.

9. A testing apparatus for ball bearings and the like comprising a support, a pair of rollers journalled in parallel relation on said support, means for rotating said rollers in the same direction, a pair of magnetizing contacts, air cylinder means for reciprocating said contacts toward and away from each other in parallel relation to said rollers, control means for synchronizing the movement of said rollers and air cylinders to rotate a bearing placed on said rollers through successive mutually perpendicular axes, means for energizing said contacts to impart successive magnetizing shots upon successive movements of said rollers and means for spraying magnetic fluid onto said rollers in synchronization with successive movements thereof.

10. A testing apparatus for ball bearings and the like comprising a support, a pair of rollers journalled in parallel relation on said support, means for rotating said rollers in the same direction, a pair of magnetizing contacts, air cylinder means for reciprocating said contacts toward and away from each other in parallel relation to said rollers, control means for synchronizing the movement of said rollers and air cylinders to rotate a bearing placed on said rollers through successive mutually perpendicular axes, means for energizing said contacts to impart successive magnetizing shots upon successive movements of said rollers and means for spraying magnetic fluid onto said rollers in synchronization with successive movements thereof, including a tank in said support, a spray station above said rollers and means for pumping fluid to said spray station from said tank.

11. A testing apparatus for ball bearings and the like comprising a support, a pair of rollers journalled in parallel relation on said support, means for rotating said rollers in the same direction, a pair of magnetizing contacts, air cylinder means for reciprocating said contacts toward and away from each other in parallel relation to said rollers, control means for synchronizing the movement of said rollers and air cylinders to rotate a bearing placed on said rollers through successive mutually perpendicular axes, means for energizing said contacts to impart successive magnetizing shots upon successive movements of said rollers and means for spraying magnetic fluid onto said rollers in synchronization with successive movements thereof, including a tank in said support, a spray station above said rollers, means for pumping fluid to said spray station from said tank and means for recirculating the fluid through said tank and spray station.

12. A device for testing ball bearings and the like comprising a support, a pair of rollers journalled in parallel relation on said support means for rotating said rollers in the same direction, and a pair of magnetizing contacts with said rollers, and means for reciprocating said contacts toward and away from one another, whereby a bearing placed between said rollers and said contacts may be rotated through successive 90° angles to receive successive magnetizing shots from said contacts, said rollers being tapered uniformly from their centers to position a bearing against one or the other of said contacts.

References Cited in the file of this patent
UNITED STATES PATENTS

| | | |
|---|---|---|
| 2,432,786 | Newman | Dec. 16, 1947 |
| 2,455,874 | Newman | Dec. 7, 1948 |